United States Patent [19]

Upp

[11] Patent Number: 4,998,242

[45] Date of Patent: Mar. 5, 1991

[54] VIRTUAL TRIBUTARY CROSS CONNECT SWITCH AND SWITCH NETWORK UTILIZING THE SAME

[75] Inventor: Daniel C. Upp, Southbury, Conn.

[73] Assignee: TranSwitch Corp., Shelton, Conn.

[21] Appl. No.: 283,178

[22] Filed: Dec. 9, 1988

[51] Int. Cl.$^5$ ............................................. H04Q 11/04
[52] U.S. Cl. .......................................................... 370/60
[58] Field of Search ...................... 370/60, 60.1, 59, 66, 370/67, 84, 94.1, 95.1, 100.1, 102, 105.1, 112, 110.1, 58.1

[56] References Cited

U.S. PATENT DOCUMENTS 4,719,624  1/1988  Bellisio .................................. 370/112
4,855,999  8/1989  Chao ..................................... 370/112

Primary Examiner—Douglas W. Olms
Assistant Examiner—Wellington Chin
Attorney, Agent, or Firm—David P. Gordon

[57] ABSTRACT

Switching components and switching networks utilizing a plurality of identical switching components are provided for cross-connecting virtual tributaries of a plurality of substantially SONET formatted signals. The switching components each receive at least one SONET formatted signal and disassemble the signal into its virtual tributary (VT) payload components while marking the V5 byte. The VT data is buffered and switched in phase, time, and space to effect the cross-connect onto SONET signal generating output buses which are synchronously clocked buses running through the components. The space switch is essentially a non-blocking switch matrix. The time switch is a comparison means associated with each incoming VT which compares the VT destination of the data in the buffer to a virtual tributary time indication based on the phase of the synchronous clocked output buses. When the bus phase is indicative of the VT destination of the data, the data is sent to the output bus dictated by the space switch connection. Phase switching is obtained by determining the difference in phase of the incoming VT as defined by the tagged V5 byte and the phase of the synchronous clocked output bus. The phase difference permits a VT frame pointer to be correctly generated. To establish component and system operation and timing, a system bit clock and multiframe clock are provided, with the internal clock of each component in a network chain being advanced one bit clock relative to its adjacent lower component.

35 Claims, 13 Drawing Sheets

B DENOTES AN 8-BIT BYTE

NEGATIVE STUFF OPPORTUNITY

POSITIVE STUFF OPPORTUNITY

NEW DATA FLAG:
  INVERT 4 N BITS
  ACCEPT EXACT MATCH

NEGATIVE STUFF:
  INVERT 5 D BITS
  ACCEPT MAJORITY VOTE

POSITIVE STUFF
  INVERT 5 I BITS
  ACCEPT MAJORITY VOTE

I-INCREMENT BIT
D-DECREMENT BIT
N-NEW DATA FLAG BIT

FIG. 7

PRIOR ART

| VT 1.5 | VT 2 | VT 3 | VT 6 |
|---|---|---|---|
| V1 | V1 | V1 | V1 |
| 78 | 105 | 159 | 321 |
| ⋮ | ⋮ | ⋮ | ⋮ |
| 103 | | | |
| V2 | 139 | 211 | |
| 0 | V2 | V2 | 427 |
| ⋮ | 0 | 0 | V2 |
| 25 | ⋮ | ⋮ | 0 |
| V3 | 34 | | ⋮ |
| 26 | V3 | 52 | |
| ⋮ | 35 | V3 | |
| 51 | ⋮ | 53 | 104 |
| V4 | 69 | ⋮ | V3 ← NEGATIVE STUFF OPPORTUNITY |
| 52 | V4 | 105 | 107 ← POSITIVE STUFF OPPORTUNITY |
| ⋮ | 70 | V4 | ⋮ |
| 77 | ⋮ | 106 | 213 |
| | 104 | ⋮ | V4 |
| | | 158 | 214 |
| | | | ⋮ |
| | | | 320 |

DESIGNATIONS:

V1 VT PTR1
V2 VT PTR2
V3 VT PTR3 (ACTION)
V4 VT RESERVED

NEW DATA FLAG-INVERT 4 N BITS-ACCEPT EXACT MATCH
NEGATIVE STUFF-INVERT 5 D BITS-ACCEPT MAJORITY VOTE
POSITIVE STUFF-INVERT 5 I BITS-ACCEPT MAJORITY VOTE

VIRTUAL TRIBUTARY CROSS CONNECT SWITCH AND SWITCH NETWORK UTILIZING THE SAME

BACKGROUND

The subject matter of this invention is related to the subject matters of inventions entitled "Switch Components and Multiple Data Rate Non-Blocking Switch Network Utilizing the Same" U.S. Ser. No. 07/283,173 issued as U.S. Pat. No. 4,914,429, "System for Cross Connecting High Speed Digital Signals" U.S. Ser. No. 07/283,171, and "System for Cross Connecting High Speed Digital SONET Signals" U.S. Ser. No. 07/283,172, all of which are filed of even date, are of common inventorship, are assigned to the assignee hereof, and all of which are hereby incorporated by reference herein.

This invention relates generally to switch components and non-blocking switching networks utilizing a plurality of switch components. More particularly, the invention relates to a switching component capable of receiving data from at least one virtual tributary of a larger signal, retiming the data, and switching that data at a desired time to a desired location. The switching network utilizing a plurality of such switch components receives a plurality of virtual tributaries, many of the virtual tributaries constituting a SONET signal, and creates new SONET signals comprised of rearranged virtual tributaries.

Standards for SONET telecommunication have been promulgated by ANSI in ANSI T1.105-1988 and are detailed in *SONET Transport Systems, Common Generic Criteria*, TA-TSY-00253 Issue 3, July 1988, published by Bellcore, as well as other documents known to those skilled in the art. A basic SONET signal, termed an STS-1 signal, is seen in FIG. 1. The SONET signal is a 51.84 Mhz, bit-serial signal, having nine rows of ninety columns of eight bit bytes at a 125 microsecond frame rate. The first three columns of bytes in the SONET signal are termed the transport overhead (TOH) bytes and are used for various control purposes as indicated in FIG. 2. The remaining eighty-seven columns of bytes constitute the STS-1 Synchronous Payload Envelope (SPE) as seen in FIG. 3.

Turning to FIG. 2, it is seen that the first two bytes A1 and A2 of the transport overhead are framing bytes which contain a specified framing pattern allowing synchronization of the basic SONET STS-1 signal. Three other bytes, H1, H2, and H3 form a pointer giving explicit information as to the location of the start of the SONET SPE. The pointer bytes are required due to the fact that the position of the SPE is not fixed in time in the STS-1 frame, but is allowed to be displaced in time. The SPE may move slowly backward and forward in time relative to the STS-1 frame due to varying circuit conditions. Hence, as seen in FIG. 3, a single SPE is seen to typically straddle two consecutive STS-1 frames.

In actuality, as seen in FIG. 4 which sets forth the payload pointer coding, the pointer for the SPE is located in the last ten bits of the word formed by bytes H1 and H2. The pointer value is an offset value and designates the location after byte H3 of the first byte of the SPE. Thus, if the pointer value is zero (i.e. zero offset), the first byte of the SPE is located in the first byte position after the H3 byte. If the pointer value equals one, the SPE starts at the second byte past byte H3. The greatest value allowed for the pointer is seven hundred eighty-two (equal to 810 - 27 - 1; 810 bytes in the frame, less 27 bytes for the TOH, less one byte to find the final location). The value of seven hundred eighty-two indicates, as seen in FIG. 5 which shows byte locations, that the SPE starts at the last byte position before the H1 byte of the next STS-1 frame.

As indicated in FIGS. 4 and 5, during normal operation, two kinds of pointer adjustments are allowed. A negative stuff is utilized when the SPE being transported is running at a frequency higher than that of the STS-1 envelope (i.e. additional information must be inserted into the envelope), while a positive stuff is utilized where the SPE is running at a frequency slower than the STS-1 signal (i.e. stuff bytes are inserted into the envelope). Regardless, the SPE phase is moved by one byte, forward or backward in time.

Turning to FIG. 6, it is seen that the payload of the SONET signal is subdivided into a number of "virtual tributaries" (VTs), where a virtual tributary is an arrangement of a specified number of bytes in the SPE payload. Column one of the STS-1 SPE contains control information termed "path overhead" (POH) which is relevant to the VTs of the payload, while columns thirty and fifty-nine contain fixed stuff which is essentially irrelevant for purposes herein. SONET signals are composed of a number of VTs which may all be of the same, or an allowed mix of sizes; e.g. VT1.5, VT2, VT3, VT6. In the United States, a SONET signal is typically comprised of twenty-eight DS-1 virtual tributaries. For example, a DS-1 signal is carried on a VT1.5 which consists of three columns of bytes in designated time locations. In FIG. 6, virtual tributary number two is shown in columns three, thirty-two and sixty-one of the eighty-seven column SPE.

As seen in FIGS. 2 and 6, the path overhead includes a byte H4 which is termed the "multiframe indicator". The multiframe indicator is used to establish which of four bytes V1, V2, V3 and V4 which index four phases of a four-frame SPE superframe cycle is in the first location of the currently-received payload. Coding of the VT pointers is seen in FIG. 8, with V1 and V2, which are located in two consecutive STS-1 SPE's, containing a pointer to the virtual tributary synchronous payload envelope (which extends over four SONET frames; hence the need for phase indexing). The start of te VT-SPE is the V5 byte. The byte offset definitions, and hence the V5 byte positions are shown in FIG. 9. As indicated in FIG. 9, positive and negative stuffs are allowed at the VT level, much as it is at the STS-1 level, with a positive stuff required when the signal carried in the VT is running slow, and a negative stuff required when it is running fast.

SONET signals are allowed to be of various modes, including asynchronous, bit synchronous floating or locked, and byte synchronous floating or locked. The switching network performs the required cross-connect functions on asynchronous VTs and on bit or byte synchronous VTs of the floating mode. To cross-connect locked mode VTs, they must first be converted to floating mode in a manner such as described in the BellCore TA-TSX-000253 publication, as their construction is different and contains no VT pointer.

The source of a SONET STS-1 signal is typically a multiplexer which can multiplex twenty-eight T-1 signals into twenty-eight VT1.5 virtual tributaries in a SONET formatted signal. In a system of multiple SONET links such as is seen in FIG. 10, it is often desirable to form a logical path between some T-1 end point X and another T-1 end point Y, where X and Y are on two different SONET STS-1 links P and Q. The system used to form such a logical path is called a cross-connect system. In particular, where SONET formatted signals are being cross-connected, the basic function of the cross-connect system is to switch the virtual tributaries of the incoming SONET signals in time and space into virtual tributaries of outgoing SONET signals. Special considerations in implementing such a system are the asynchrony of the input SONET signals and of their constituent VTs, and the need to reformat a number of mutually asynchronous VTs into a properly constructed outgoing SONET signal.

SUMMARY OF THE INVENTION

With the SONET signal as aforedescribed, those skilled in the art will appreciate that it is desirable to provide an electronic digital cross-connect system which can terminate a plurality of SONET signals, disassemble the SONET signals into their constituent signals (i.e. VT payloads), switch the constituent signals in time and space, and reassemble new SONET signals from the switched constituent signals. Indeed, it is an object of the invention to provide such an electronic digital cross-connect system.

It is a further object of the invention to provide a virtual tributary cross-connect switch component such that an electronic digital cross-connect system of virtually any desirable size can be established by utilizing a plurality of identical cross-connect switch components.

In constructing an electronic digital cross-connect system capable of switching virtual tributaries of a SONET signal various critical considerations must be addressed. First, since different SONET signals terminating on the switch may be of slightly different frequency and of different STS-1 SPE phases, the cross-connect system must deal with asynchronous incoming SONET frequencies, payload phases, and phase drifts. Second, since all of the payloads of the virtual tributaries are asynchronous (although defined by the VT pointers), the virtual tributaries switched into a particular place to be formed into an outgoing SONET signal will have differing phases and phase drifts. Hence, the phase of each VT payload must be tracked in some way in order to permit its use in the reconstruction of a proper virtual tributary within a proper SONET signal. Finally, because the payload carried in each virtual tributary is subject to time shifts due to both phase drift and pointer movements, elastic buffering is required to ensure that there are always signal bytes to send at designated transmit times. In sum, besides disassembling the incoming SONET signals into its virtual tributary SPEs and performing a "space" switching function, the cross-connect system must buffer the virtual tributary SPE data, switch the VT SPEs in time, tag the payload so that its starting time is known, and reassemble the payloads into defined tributary times in a new SONET signal.

In accord with the objects of the invention, the preferred switching component of the invention comprises:

(a) at least one data receiving means, each data receiving means having means for receiving a substantially SONET formatted data signal, means for disassembling the SONET formatted data signal into its virtual tributary payloads, and means for recognizing and tagging bytes indicative of the phase of said virtual tributary payloads;

(b) buffer means for each virtual tributary payload for buffering a plurality of bytes received from the receiving means;

(c) a plurality of time synchronous clocked output buses on which are generated the SONET formatted data signals being generated;

(d) pointer calculation means associated with each buffer means, each pointer calculation means including means for determining via the tagged bytes a phase difference between the phase of a virtual tributary payload received in the buffer means and the phase of the virtual tributaries of said SONET formatted data signal being generated;

(e) non-blocking space switching means for coupling the buffer means to any of the output buses; and (f) time switching means for comparing a virtual tributary destination indication of the virtual tributary payload in said buffer means with a virtual tributary time indication based on the phase of the synchronous clocked output buses, and for writing virtual tributary payload data stored in the buffer means onto one of said output buses as dictated by the non-blocking switching means when the destination indication and time indication correspond.

For purposes herein, the term "substantially SONET formatted signal" shall be understood to be a signal in SONET form having its virtual tributaries as well as at least the A1, A2, H1, H2, and H4 overhead bytes defined. In all except the synchronous locked mode of the SONET signal, the V1 and V2 bytes must also be defined for the signal to be in substantially SONET format. The other overhead bytes need not be defined.

In the preferred embodiment, the functions of time buffering, pointer recalculation, time switching and space switching are implemented in the switching component on a per-VT basis, with identical circuitry per VT replicated twenty-eight times per SONET signal. The buffering is preferably accomplished by using three byte FIFOs with an internal control keeping track of the number of words in the FIFO. The bytes of the VT payload pass through the FIFO in sequence. If a FIFO section is empty, a positive stuff is generated and the tracking means in the pointer recalculation means causes the pointer recalculation means to advance. If a section is full, a negative stuff is generated and the tracking means causes the pointer recalculation means to subtract. Also, preferably, the pointer recalculation means counts in an initialization period the time between the location of the V3 byte and the V5 byte. That count is used to set the pointer found in bytes V1 and V2 for the next virtual tributary superframe.

The preferred time switching means preferably includes a memory means for storing an indication of a virtual tributary destination for the bytes in the buffer means as dictated by a system controller, and a comparison means for comparing the stored virtual tributary indication to a value received from a component timing section indicating the virtual tributary of the SONET frame being currently assembled.

The preferred space switching means includes a switch matrix for connecting a plurality of time synchronous clocked output buses to the FIFOs containing the received VT data at the times designated by the time switching means. Control of the switch matrix is in a memory means associated with each FIFO. The memory means store indications of the destination SONET output buses for the VT payload as dictated by a system controller.

In order to establish component operation and timing, the switch component is provided with a SONET bit clock, and a multiframe clock which establishes a four STS-1 frame long VT multiframe. The clocks are used to establish the necessary timing signals for component operation and the output buses are synchronized such that all points in time as defined by the clocks are directly associable with locations within the generated SONET signals.

The preferred switch network of the invention utilizes a plurality of switching components arranged in a column with the outputs of one component fed as inputs to the component adjacently lower in the column. The bit clock signal which is applied to each component in the switch network column is advanced by one bit clock cycle per switch component upward, such that the phase of the switch component located at the top of a column of N components is n-1 bit clock intervals ahead of the phase of a component located at the bottom of the column. The SONET signals are generated from the top of the column, and by delaying the signal by one bit clock per component, the phase advances are removed and synchrony is established.

The switch network of the invention may be expanded simply by adding additional switching components vertically and horizontally. The addition of components vertically permits additional SONET signals to be processed and placed on the existing SONET generating output buses. However, with additional SONET signals being processed, additional output buses are required for full duplex connectivity, and the horizontal addition of switching components provides the additional bus capacity.

Additional objects and advantages of the invention will become apparent to those skilled in the art upon reference to the detailed description in conjunction with the provided Figures.

BRIEF DESCRIPTION OF THE DRAWINGS

FIG. 7 is a diagram showing the virtual tributary superframe according to the Bellcore TA-TSY-00253 document;

DETAILED DESCRIPTION OF THE PREFERRED EMBODIMENT

Figure 11:
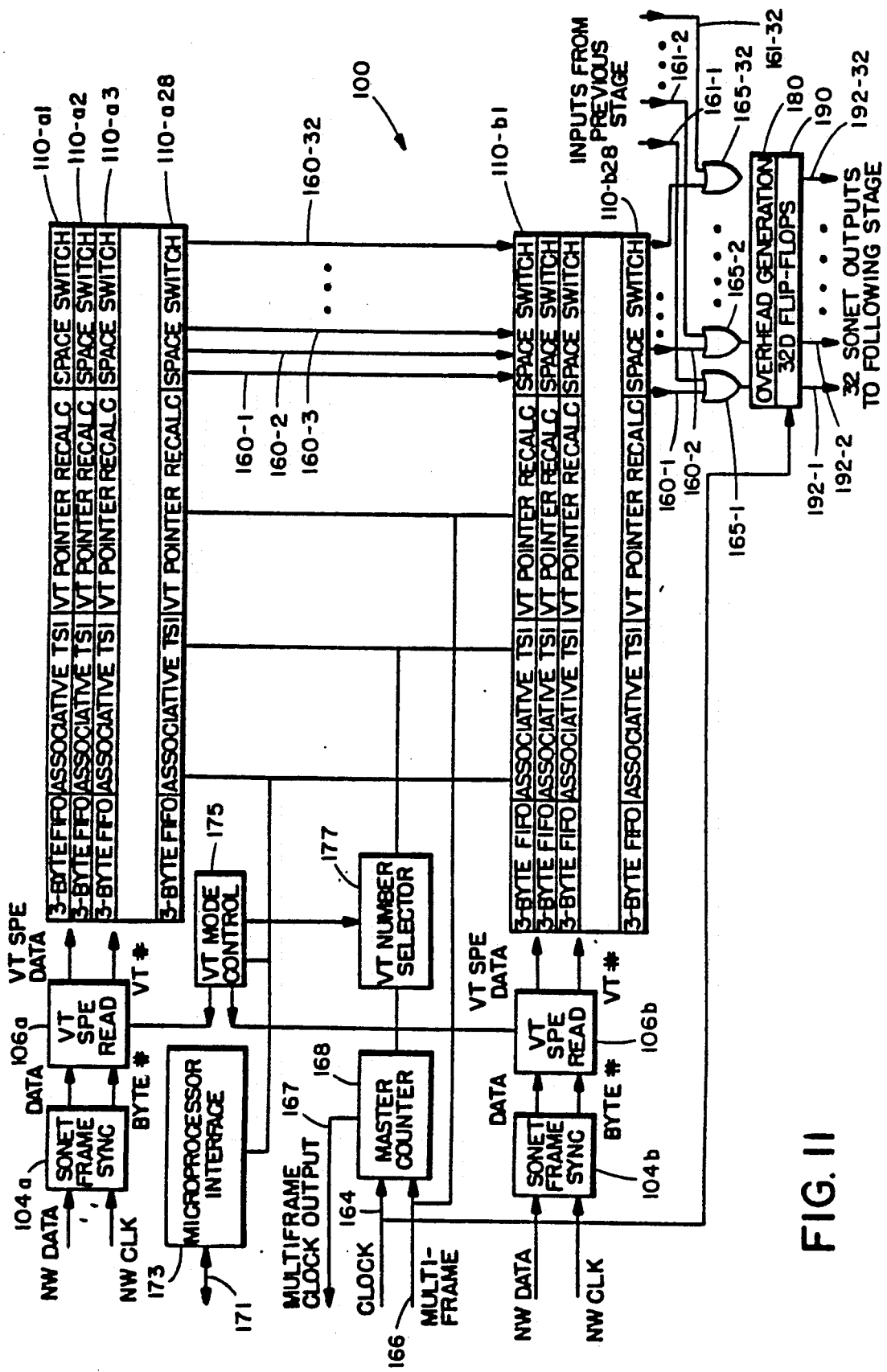
FIG. 11 is a block diagram of the switching component of the invention, particularly detailing the receiving means of the switching component.

Turning to FIG. 11, a block diagram of a single switching component 100 of the invention is seen with particular detail to the receiving means of the component. At the outset, it should be noted that while the preferred component 100 is capable of receiving two incoming SONET formatted signals, the invention is intended to encompass components that are capable of receiving one or more such incoming SONET formatted signals. In addition, while the preferred component is arranged to accommodate the STS-1 rate of 51.84 Mb/s, modifications for accommodating SONET signals at the STS-3 rate (155.52 Mb/s) or higher rates will readily suggest themselves to one skilled in the art.

In component 100, SONET signals are received by SONET frame synchronization circuitry 104a and 104b which find the A1 and A2 bytes of the SONET signals. In this manner, the SONET frames may be deciphered to determine the location of the SPEs within the frame. (From hereon, for purposes of brevity, the circuitry relating to a single SONET signal will be described). The synchronization circuitry 104a outputs the received data along with a byte number which indicates to which byte within the SONET frame the data belongs. The VT SPE read circuitry 106a receives the bytes of data and byte numbers, finds bytes H1 and H2, and locates the start of the SPE within the received signal. With knowledge of the SPE location, the VT SPE read circuitry 106a locates the VT path overhead, and in particular byte H4, so that a determination of the phase of the virtual tributaries within the SPE (as defined by the H4 byte) may be had. Then, with knowledge of H4, the V1 and V2 bytes of the virtual tributaries are found so that the starting time (i.e. V5 byte location within the payload frame) of each of the virtual tributary payloads can be found and tagged. The VT SPE read circuitry 106a in a byte serial manner, based on the format of the incoming SONET signal essentially demultiplexes the SONET signal into its component virtual tributaries and forwards the payload (data) of each virtual tributary to its appropriate VT section or slice 110a-1 through 110a-28. In sending the data to its VT slice, the SONET transport overhead, path overhead and VT pointer bytes are discarded. The V5 byte of each virtual tributary payload is tagged, however, as it is sent into the VT section slice 110a-1 through 110a-28 in order to preserve the phase information of the VT payload.

Depending on the format of the incoming SONET signal as known to the VT mode control 175, different numbers of the twenty-eight available VT slices might be utilized for a single SONET signal. Thus, if the SONET signal is comprised of twenty-eight VT1.5 virtual tributaries, all twenty-eight slices 110a-1 through 110a-28 are utilized. However, if some of the virtual tributaries are VT2, VT3 or VT6 virtual tributaries, fewer slices are utilized. Of course, with fewer virtual tributaries, the rates of data flowing into and out of the slices will be greater.

Figure 12:
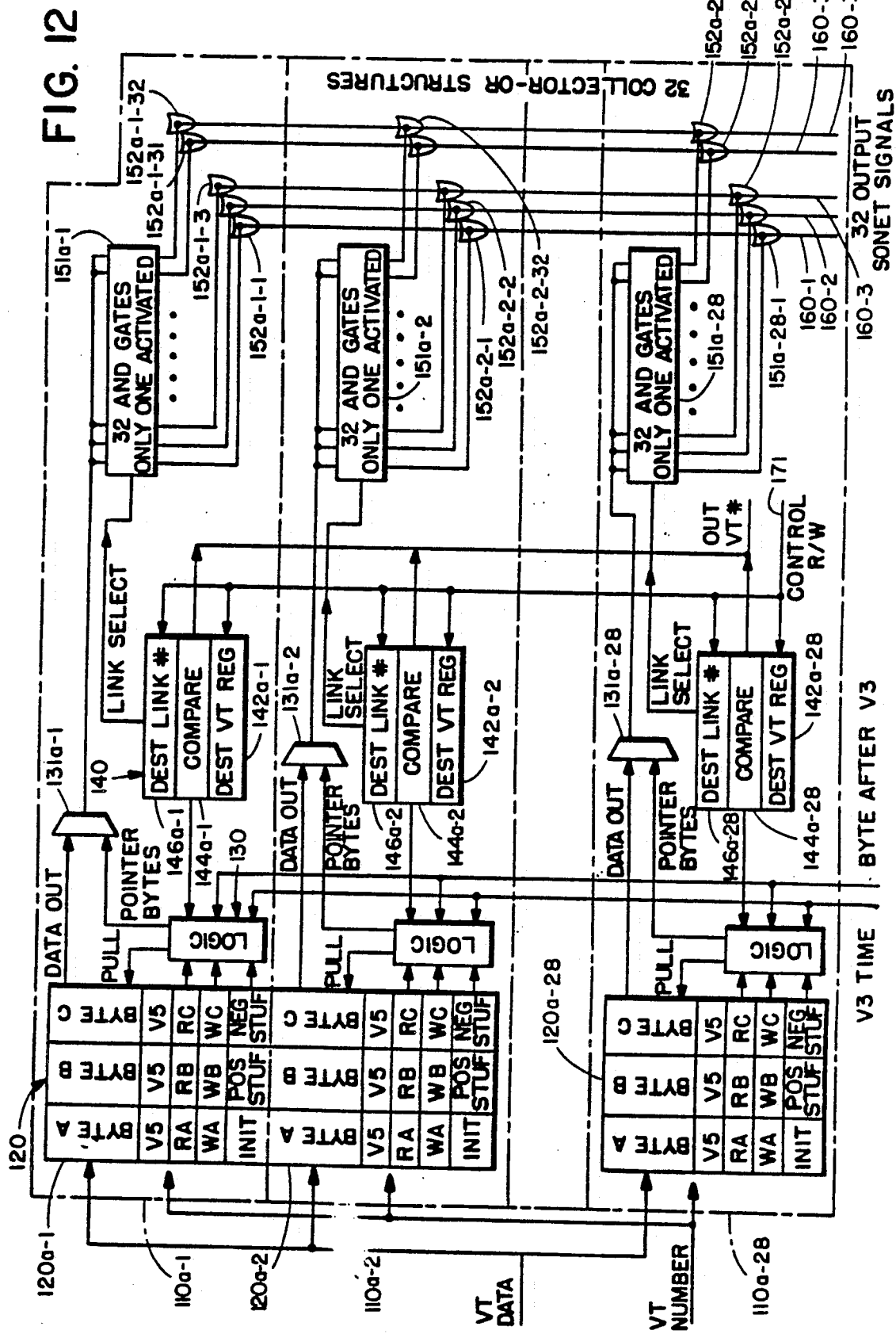
FIG. 12 is a block diagram of the pointer recalculations means, the memory means and the comparison means of the switching component of the invention.

With the virtual tributary data having been demultiplexed out of the SONET frame by the receiving circuitry, the switch component 100 must then perform the functions of switching the VTs in space and time, and reassemble the VTs into new SONET signals. A block diagram for accomplishing the same is seen in FIG. 12 where three of twenty-eight slices (twenty-eight slices representing one half of component 100) are seen in more detail. In essence, each slice 110 may be broken down into four components: buffer means 120 for storing the incoming data on a FIFO basis and for storing the V5 tags; pointer calculation means 130 for determining the phase offset between the incoming virtual tributaries and the SONET signals which are being generated (i.e. for calculating the pointer contained in V1 and V2 so that it will properly point to the position of V5 in the generated SONET signals); read/write means 140 including memory means 142 for storing the virtual tributary destination of the data stored in the buffer, comparison means 144 for comparing the stored virtual tributary destination to a clocked signal indicative of the virtual tributary of the to-be-generated SONET signal requiring data, and memory means 146 for storing the output SONET link destination number for the stored VT; and non-blocking switch matrix means 150 including AND gate means 151a-1 through 151a-28 and OR gate means 152-1 through 152-32 for connecting virtual tributary data contained in any of the buffer means 120 to any of thirty-two data buses 160-1, ..., 160-32 (seen in FIG. 11) on which the new SONET signals are generated. As seen in FIG. 11, system inputs into slices 110 include a 51.84 MB/s system bit clock 164 and a 2 kHz multiframe clock 166 which defines for the slices which quarter of the virtual tributary multiframe is located in the particular SONET SPE. Master counter 168 produces an output multiframe clock signal 167 advanced in time by one system bit clock from the input multiframe clock 166, such that the component at the top of an array of n components is n-1 system bit clocks ahead of the component at the bottom of the array. Control information from a processor (not shown) is also input into the slices via processor bus 171 and microprocessor interface 173. The control information is used to set the memory means 142 and 146 of read/write means 140 (seen in FIG. 12) such that particular incoming virtual tributaries of disassembled SONET signals can be inserted via switch matrix means 150 onto a desired SONET generation bus 160 at a desired time (i.e. corresponding to a desired VT).

Turning back to FIG. 12, more details of the component 100 are seen. In particular, it is seen that the virtual tributary data assigned to slice 110a-1 is received in a buffer 120a-1. Buffer 120a-1, as preferably configured, includes a FIFO register of three eight-bit words which stores the bytes of the VT SPE, three V5 one-bit flags which track the eight-bit words, a set of three one bit "read" flags, a set of three one-bit "write" flags, and three additional flags. The V5 flags are used to indicate whether the byte (eight bit word) contained in a particular register of the FIFO is the V5 byte. The read and write flags are basically recirculating pointers which indicate from where the next word should be read for output onto the SONET generating buses, and to where the next word should be written for storage in the FIFO. Of the three remaining flags, one indicates a positive stuff operation, one indicates a negative stuff operation, and one indicates circuit initialization which is discussed hereinafter.

Figure 1:
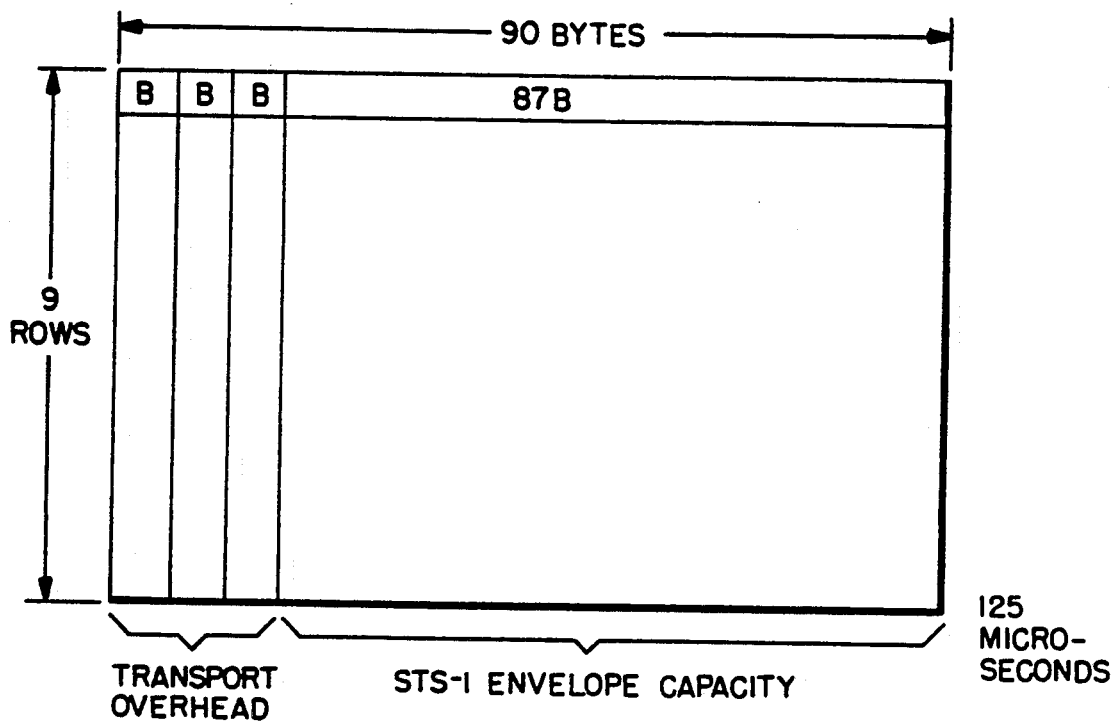
FIG. 1 is a schematic diagram of the layout of a SONET signal frame according to the Bellcore TA-TSY-00253 document.
Figure 2:
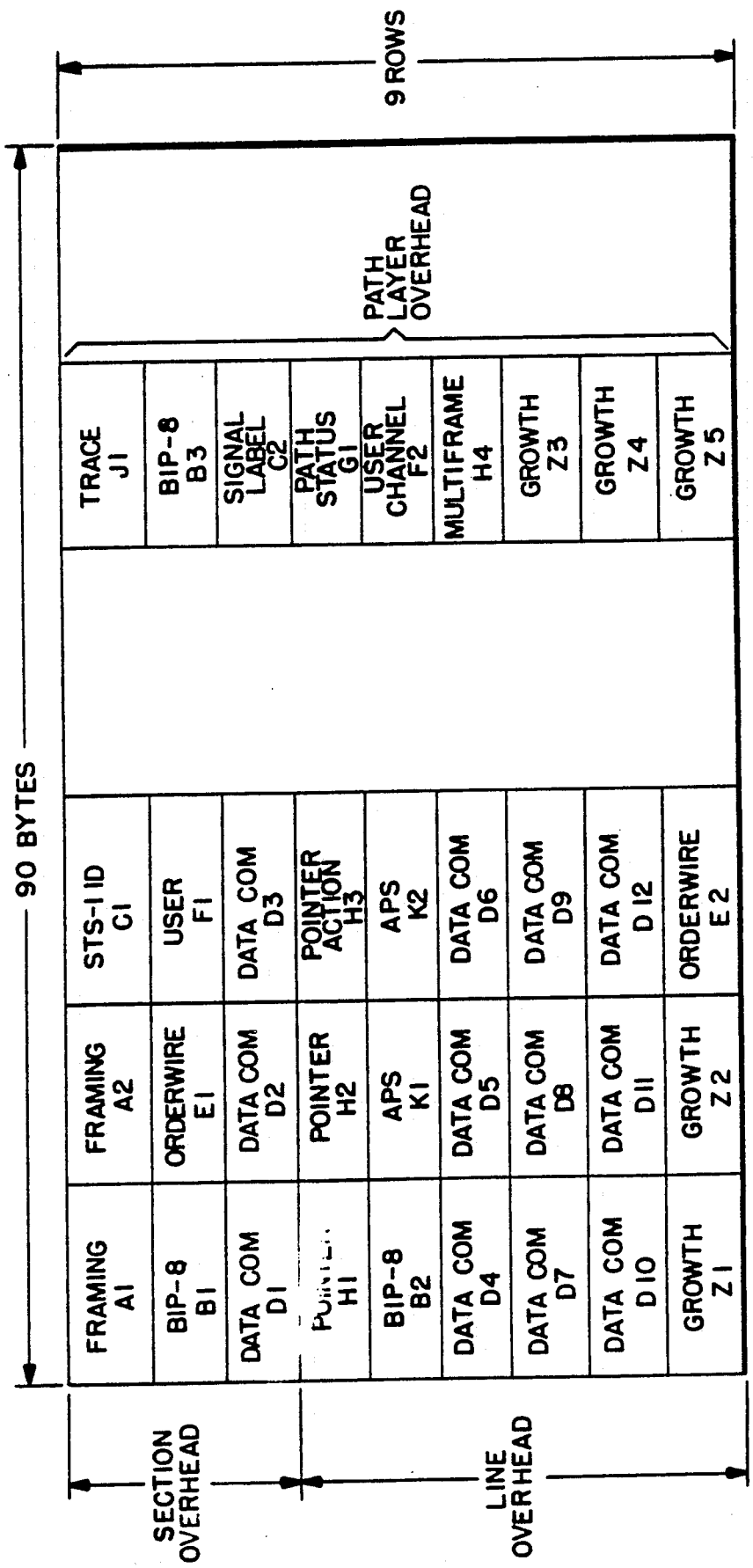
FIG. 2 is a diagram of the overhead byte location in a SONET signal frame according to the Bellcore TA-TSY-00253 document.
Figure 3:
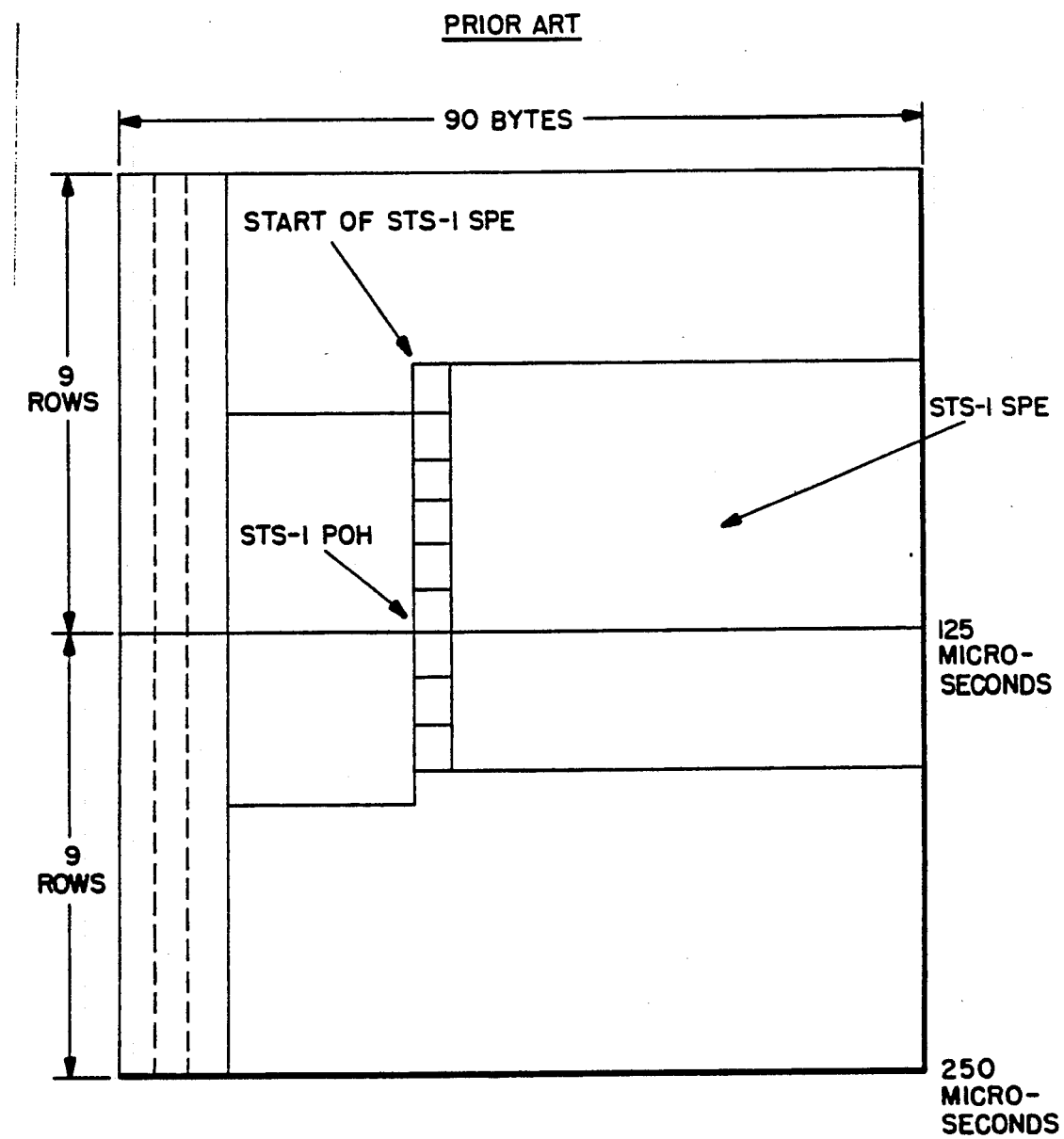
FIG. 3 is a diagram of a typical location of the SONET payload within two SONET signal frames.
Figure 4:
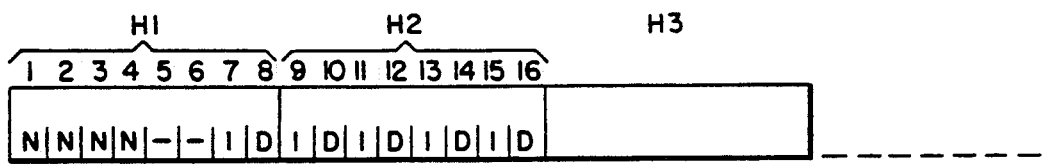
FIG. 4 is a diagram showing the payload pointer coding for a SONET signal payload according to the Bellcore TA-TSY-00253 document.
Figure 4:
Figure 5:
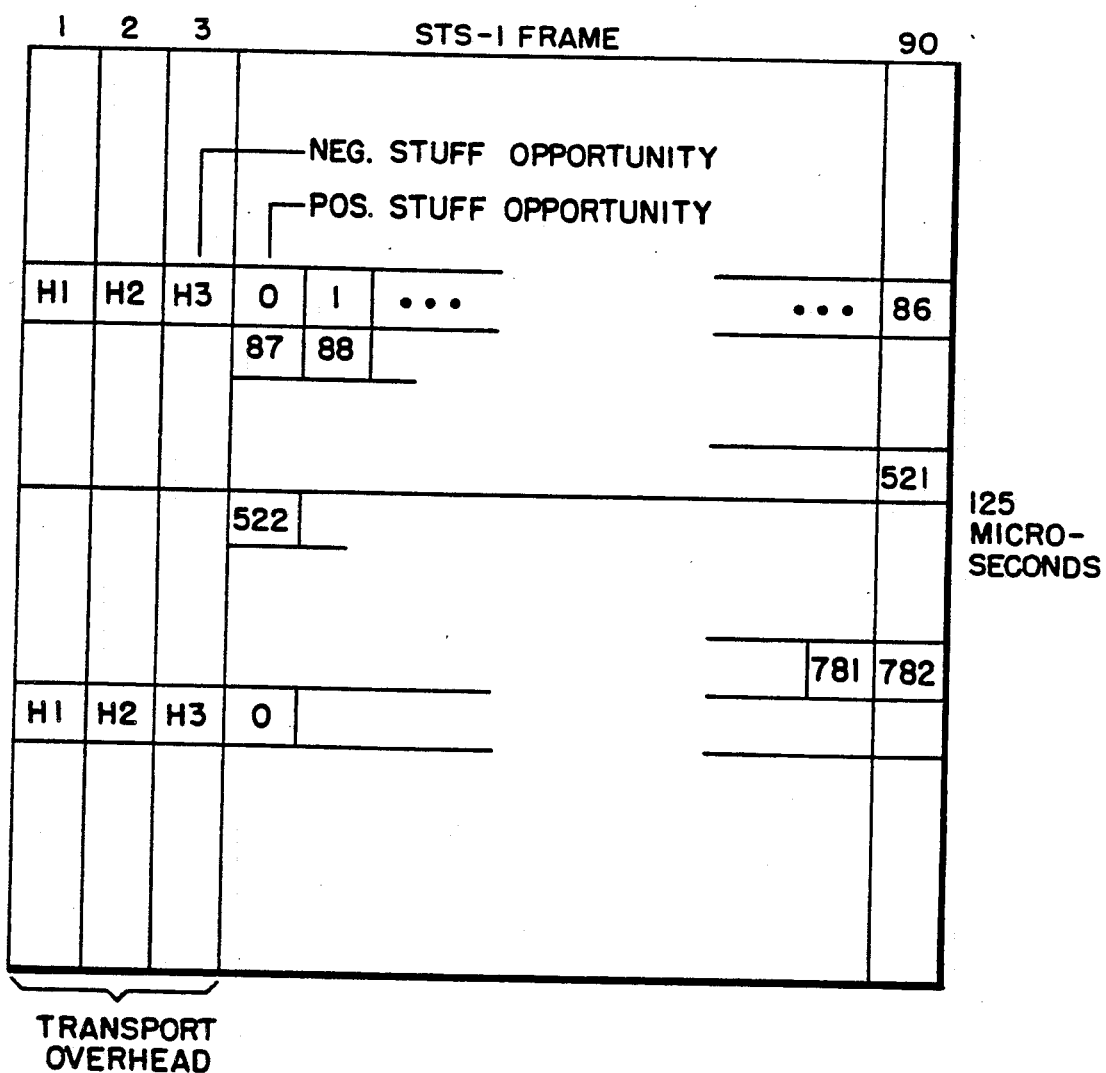
FIG. 5 is a diagram showing the SONET signal payload pointer offset numbering scheme according to the Bellcore TA-TSY-00253 document.
Figure 6:
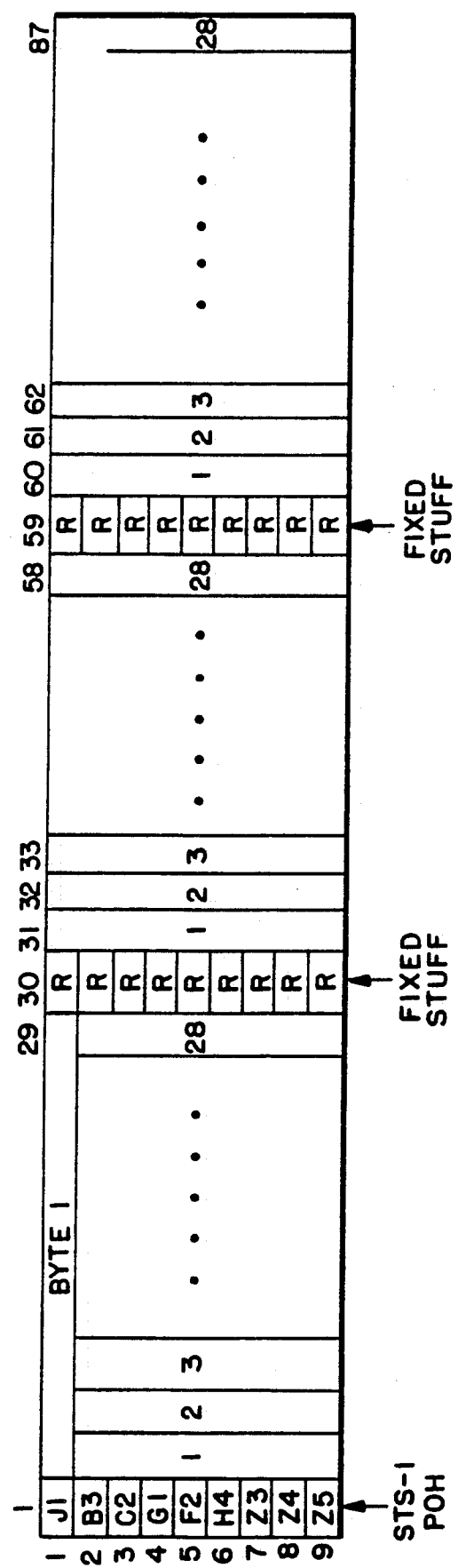
FIG. 6 is a diagram showing a SONET signal payload with the location of virtual tributaries and virtual tributary payload overhead according to the Bellcore TA-TSY-00253 document.
Figure 8:
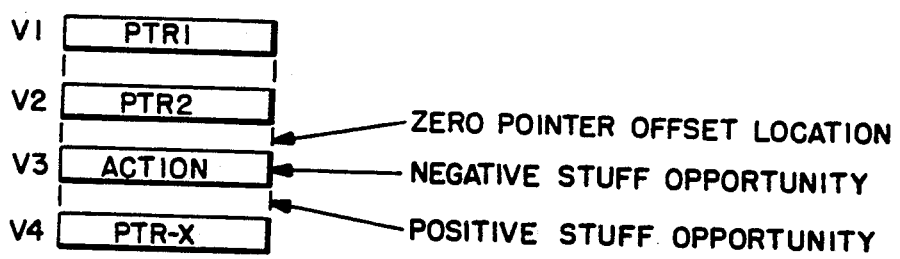
FIG. 8 is a diagram showing the virtual tributary payload pointer coding according to the Bellcore TA-TSY-00253 document.
Figure 8:
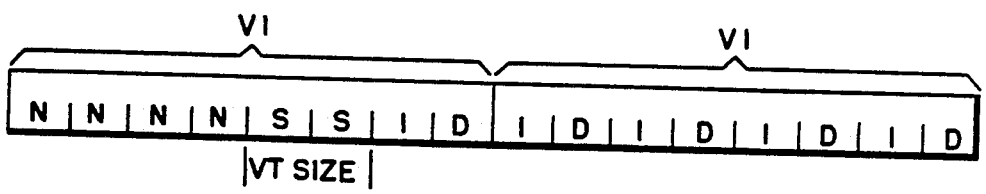
Figure 8:
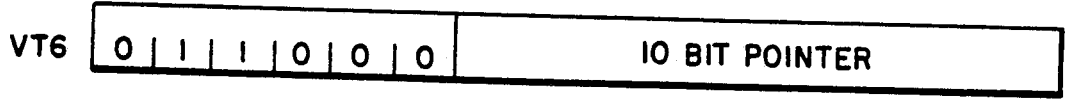
Figure 8:
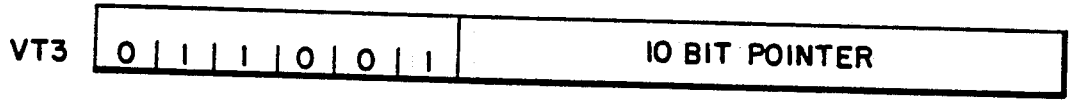
Figure 8:
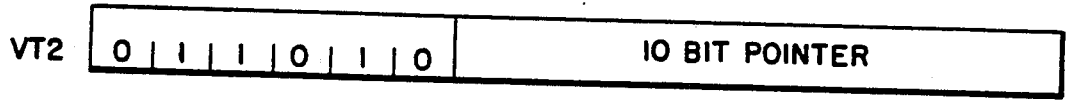
Figure 8:
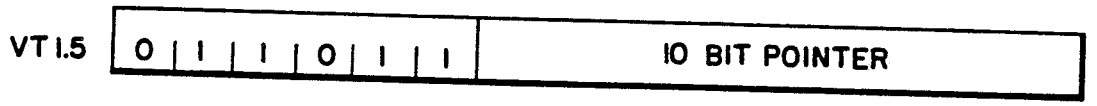
Figure 9:
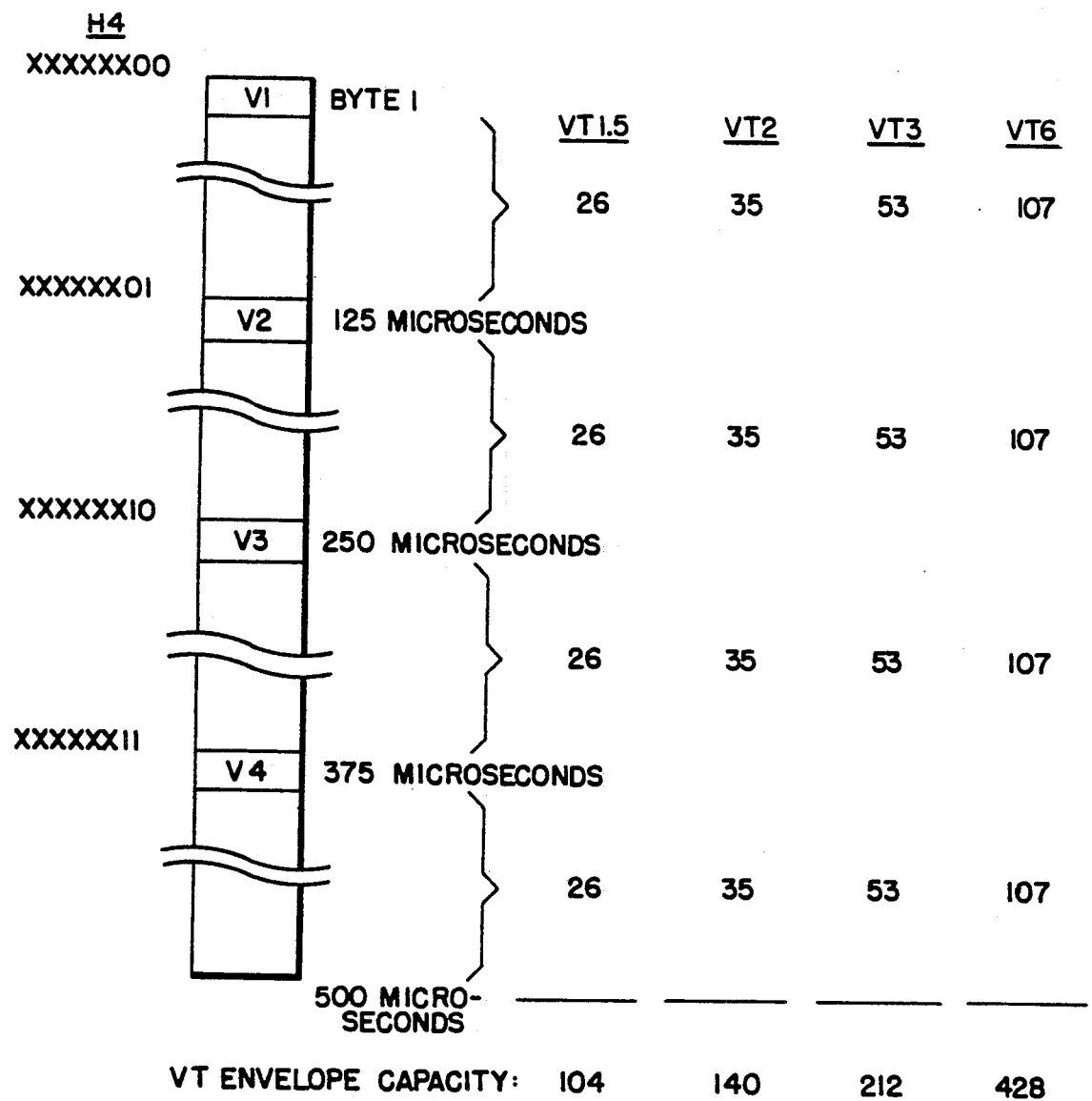
FIG. 9 is a diagram showing the virtual tributary payload pointer offsets according to the Bellcore TA-TSY-00253 document.
Figure 10:
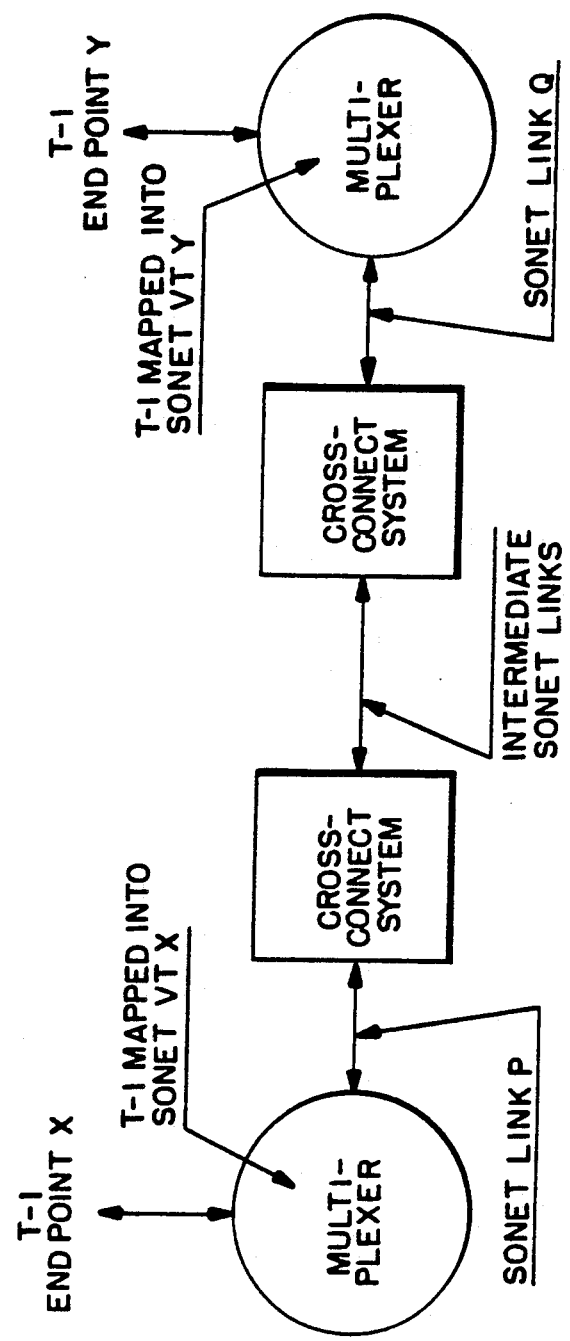
FIG. 10 is a diagram showing a typical path of a T-1 signal through a SONET system having multiplexers and cross-connects.

Pointer calculation means 130a-1 serves the multiple functions of calculating the pointer for the virtual tributary frame, tracking the positive and negative stuffs and adjusting the virtual tributary frame pointer accordingly, and generating and causing the insertion of the pointer bytes (i.e. V1, V2, etc.) in the VT data stream. In order to properly insert pointer bytes into the VT data stream, the calculation means 130 receives multiframe timing information such that it can determine when VT overhead bytes V1, V2, V3 and V4 are to be inserted into the VT data stream through the use of multiplexer 131a-1. In this regard, it should be noted that the pointer calculation means 130a-1 preferably assumes byte values for the H1 and H2 SONET overhead bytes such that the pointer contained therein has a value equal to five hundred twenty-two. In this manner the SONET signals generated by the component 100 has its VT columns aligned with the STS-1 SPE columns (such that each SONET payload is totally contained within a single SONET frame; see FIG. 5).

The virtual tributary pointer calculations conducted by the pointer calculation means 130 are primarily conducted during an initialization procedure which occurs at startup or following a reconfiguration of the system. The purpose of the virtual tributary pointer which is contained in bytes V1 and V2 is to point to the byte V5 which is the first byte in the VT frame. The value contained in the pointer bit locations of bytes V1 and V2 indicates the distance (byte offset) between byte V3 and byte V5 for that virtual tributary. Thus, during initialization (for each VT) a counter is set to zero at the V3 byte location which is located as a result of the virtual tributary frame clock 166. As each byte contained in the buffer is pulled from the buffer onto the SONET generation bus (in a manner to be described hereinafter), the counter is incremented by one. When the byte pulled from the buffer is identified as the V5 byte of the received virtual tributary as indicated by the flag bit tagging the same, the counter value is indicative of the desired pointer value which is then stored. The pointer value is then maintained and used to set bytes V1 and V2 of the succeeding virtual tributary frames. The only time the pointer value is changed is when a positive or negative stuff occurs, such that the pointer value is incremented when a positive stuff is indicated, and the pointer value is decremented when a negative stuff is indicated. In sum, the pointer calculation means 130a-1 is seen to switch a virtual tributary in "phase", as the location of the beginning of the virtual tributary frame in the incoming SONET signal will typically differ from the frame location in the generated SONET signal.

The switching of the virtual tributaries in "time" and "space" is carried out together by the read/write means 140 and the switch matrix means 150. In particular, the read/write means 140a-1 is comprised of three registers: virtual tributary destination register 142a-1, a comparison register 144a-1, and a destination SONET bus number register 146a-1. The virtual tributary destination register 142a-1 stores the virtual tributary number into which the data in the buffers 120a-1 are to be inserted.

Because the SONET generation buses are synchronized in time, the occurrence of the virtual tributaries in the SONET frame are distinctly set in time. Thus, as the master counter 168 proceeds, its value may be equated to the sequence of byte times in the overall SONET frame. For a given mix of VT sizes as stored in VT mode control 175, there is an exact mapping between the count of master counter 168 and the virtual tributary timeslot available for data insertion on the SONET generating bus. This mapping is done by VT number selector means 177 which provides a current VT number value to the comparison registers 144. The current VT number value is then compared in comparison registers 144 to the virtual tributary distination registers 142 of the read/write means 140. If the two match, it is time for the data contained in the buffer to be written onto a SONET generation bus 160. In essence, then, the switching of virtual tributary number one of the received SONET signal whose data is buffered in buffer 120a-1 into a virtual tributary number n of the generated SONET signal constitutes a switching of the virtual tributary in time.

The switching of the virtual tributary in space is accomplished by means of the destination SONET bus number registers 146 of the read/write means in conjunction with a switch matrix 150 which can connect each of the fifty-six (twenty-eight virtual tributaries times two) data buffers 120 of the switch component 100 to each of thirty-two SONET generating buses 160. SONET bus destination register 146a-1 is activated upon an output of comparator 144a-1 which causes a byte to be "pulled" from the FIFO 120a-1. The contents of register 146a-1 (which were loaded into the register by the system microprocessor via processor bus 171 and microprocessor interface 173) corresponds to the number of the SONET bus onto which the data from the FIFO is to be switched. Thus, the SONET bus destination register 146-1 acts to control some of the logic circuitry of the switch matrix 150.

Switch matrix 150 of component 100 is logically composed of fifty-six sections 151a-1 through 151a-28 and 151b-1 through 151b-28 of thirty-two AND gates each with each AND gate connected to one of thirty-two OR gates 152a-1 through 152-32. The contents of register 146a-1 (in the non-broadcasting mode) are used to activate exactly one of the thirty-two AND gates of section 151a-1, thereby permitting a byte from buffer 120a-1 to be inserted in bit-serial form via multiplexer 131a-1 onto one destination bus 160 which is the output of one OR gate 152. Thus, at the appropriate time as dictated by comparator 144a-1, data contained in buffer 120a-1 is pulled out of the buffer and written onto the bus 160 dictated by register 146a-1. In essence, then, switch matrix 150 as controlled by the destination bus number registers 146 switch the virtual tributaries in space.

The thirty-two outputs 160-1 through 160-32 of the thirty-two OR gate structures 152-1 through 152-32 contain all of the space and time switched VTs of the two SONET signals originally received by the component 100. However, in switching network as will be described with reference to FIGS. 13a and 13b, these outputs must be combined with the outputs 161-1 through 161-32 of the switch component above it in the switch network. OR gates 165-1 through 165-32 are provided for that reason. The outputs of OR gates 165 are then combined with SONET overhead bytes A1, A2, B1, H1, H2, H4, and B-2 which are generated and inserted by overhead generation means 180. The outputs of overhead generation means 180 are reclocked according to the system bit clock 164 by an array of D flip-flops 190 to produce outputs 192-1 through 192-32.

Signals 161-1 through 161-32 from the previous switch component are bit and multiframe synchronous with locally-generated signals 160-1 through 160-32 by virtue of the established one cycle bit clock offset between switch components. Hence, the combination of signals 161 and 153 may be accomplished directly by OR-ing. The outputs of OR gates 165 thus contain all of the VTs arriving on all of the components above the local component in the network as well as those arriving on the local component.

In the overhead generation means 180, the SONET signal framing bytes A1 and A2, the STS-1 pointer bytes H1, H2, and H3, the multiframe indicator byte H4, and the SONET B2 parity check bytes are inserted. To insert them at proper times, the system bit clock 164 and the multiframe clock 166 are provided. The values of A1, A2, and H3 are fixed by design. Likewise, the values of H1, H2, as aforementioned are set to provide a pointer having a value equal to five hundred twenty-two so that the SONET payload is totally contained within a SONET frame. The value of byte H4 is determined by the multiframe signal 166, while the value of B2 is calculated over each of the outputs of OR gates 165-1 through 165-32. In calculating B2, any value received from outputs 165 in the B2 byte position is ignored.

Figure 13A:
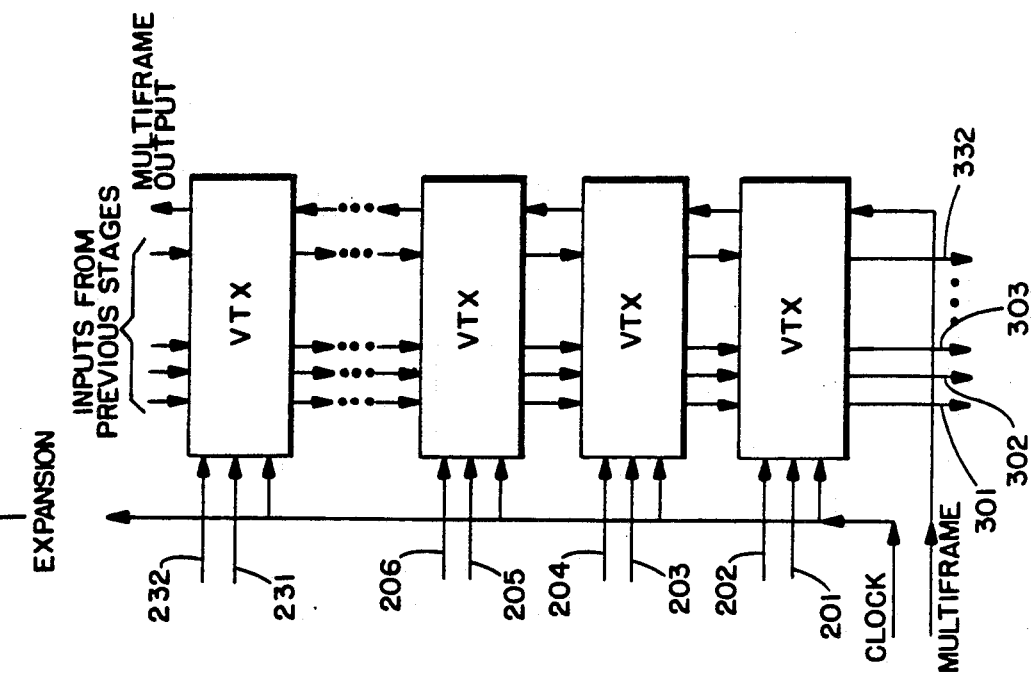
FIG. 13a is a block diagram of the switch network column of the invention utilizing a plurality of identical switching components of the invention.
Figure 13B:
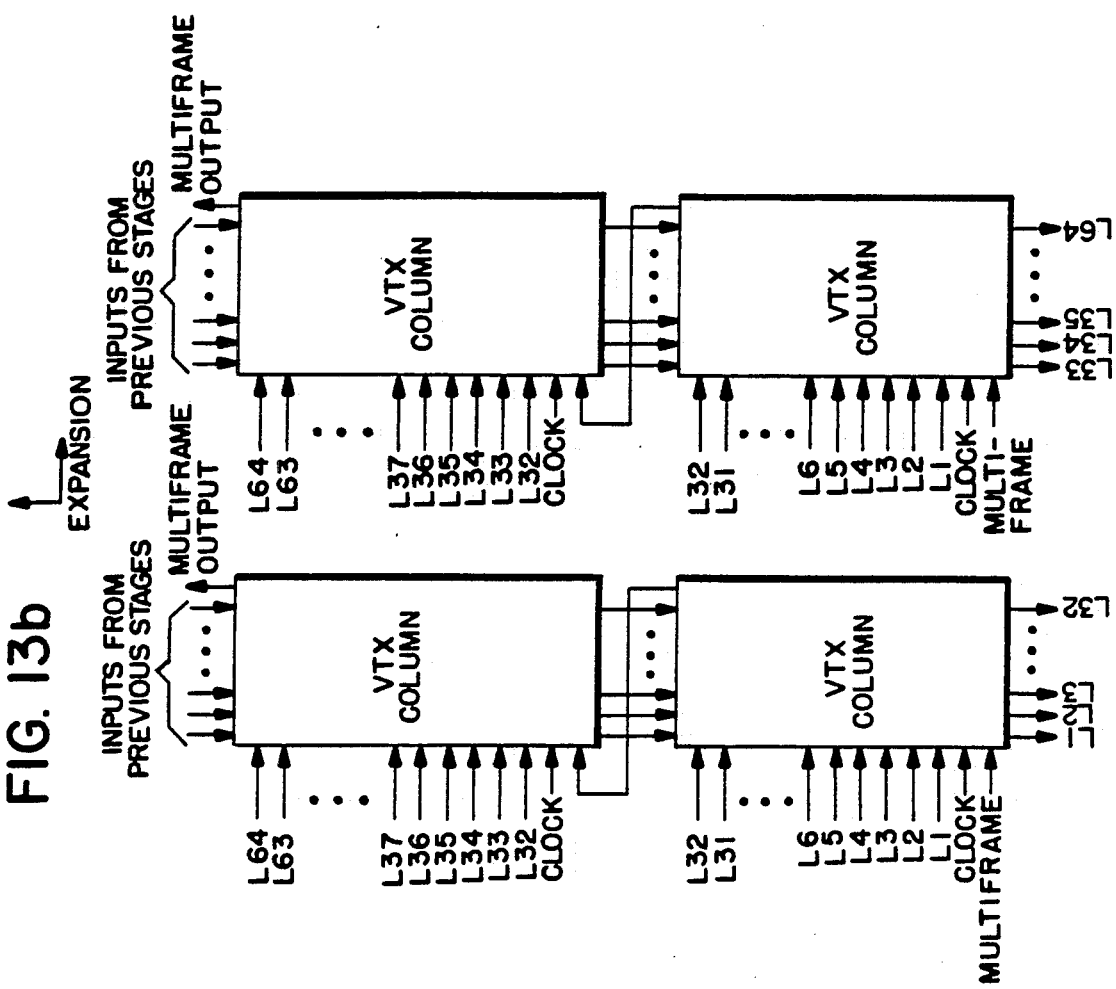
FIG. 13b is a block diagram of an expanded switch network of the invention.

Turning to FIG. 13a, it is seen that a typical switching network 200 may be comprised of sixteen switch components 100a–100p. By vertically aligning the sixteen components, up to thirty-two incoming SONET signals 201 through 232 can be handled with up to eight hundred and ninety-six virtual tributaries being switched to produce thirty-two new SONET signals 301 through 332 which are output on the thirty-two SONET generating buses 192-1, . . . , 192-32. If additional SONET signals are to be processed, the switching network is expanded both vertically and horizontally as seen for example in FIG. 13b, where four sets of sixteen switch components are utilized. Vertical expansion permits additional incoming SONET signals to be received, while horizontal expansion provides additional SONET generating buses so that additional SONET output signals can be generated. With the FIG. 13b arrangement, the virtual tributaries of up to sixty-four SONET signals may be processed and switched to create sixty-four new SONET signals. It should be appreciated that as large a network as desired may be created.

In order for the switching components and switching network to properly function such that the virtual tributaries may be switched in time, phase, and space, the entire switching network is synchronized. Each of the SONET generating buses (thirty-two per component) are in phase with each other and are timed by the system bit clock 164. In addition, as aforementioned, each switching component in a vertical column is arranged to be one system bit clock cycle time advanced from its lower-adjacent component. In particular, the multiframe clock is passed through from the bottom-most component to the top component in the column (as seen by the output of master counter 168 of FIG. 11) such that in passing the clock, each higher component is advanced in time by one system bit clock cycle relative to the adjacent lower component. As a result, as the generated SONET signal on the SONET generating buses 160 is passed down through a component, it is in time phase with the local signals of that component.

In generating new SONET signals, as aforementioned, the SONET envelope signal (overhead) is preferably generated at the overhead generating means 180 by providing values for framing bytes A1 and A2, multiframe byte H4, and the SONET SPE pointer bytes H1 and H2. At the start of each new SONET frame, the bits of the A1 and A2 framing bytes are serially placed on each bus by means 180. Because each succeeding component is displaced in time, the succeeding components continually overwrite the A1 and A2 information. However, the A1 and A2 information is overwritten (due to OR gaes 165) with identical information stored in the overhead generation means of the succeeding components. Hence, proper bytes are generated. After thirty-two clock cycles, the virtual tributary payload is reached, with the master counter indicating that byte one of virtual tributary one should be placed on the respective buses over the next eight clock cycles. Thus, those slices having virtual tributary destination registers equal to a value one pull a byte out of their buffers and in bit serial fashion place that byte on the bus to which the buffer is switched by switch matrix 150 (as indicated by the destination bus number register). At the end of those eight clock cycles, the slices of the component highest in the column could have placed at least one byte on at least one bus, while the slice of the ninth component in the column has not reached its thirty-third clock cycle. For the highest component, the next eight clock cycles would require the placement of byte one of virtual tributary two on respective buses, while for the ninth component in the column, byte one of virtual tributary one is being placed on the buses. The procedure continues for all of the components in such a fashion, with the data effectively being multiplexed onto the SONET generating buses such that the SONET frames get properly generated. In other words, the SONET frames get generated by combining the output signals of the virtual tributaries of the incoming SONET signals onto thirty-two SONET signal generating buses. When a plurality of switch components are utilized, the SONET signal generating buses run vertically through the switch components and are effectively vertically "daisy-chained".

It should be appreciated that with the provided SONET generating arrangement, most of the data used to generate the SONET signal, including the bytes of the VT SPE and the V1–V4 bytes generated by the pointer calculation means 130, are taken from the slices of the switch components. However, overhead information, including SONET framing bytes A1 and A2, SONET SPE payload pointer bytes H1 and H2 (set to a value of five hundred twenty-two), multiframe byte H4, and parity check byte B2 are generated in overhead generation means 180. The multiframe byte value H4 is dictated to the overhead generation means by the multiframe clock 166 which is one system bit cycle removed per component.

There has been described and illustrated herein a switching component and a switching network utilizing a plurality of such switching components. While particular embodiments of the invention have been described, it is not intended that the invention be limited thereby, as it is intended that the invention be broad in scope. Thus, for example, while each switching component was described as processing two SONET signals and interfacing with thirty-two SONET generating buses which run through the component, it will be appreciated that components of different sizes, capable of processing different numbers of SONET signals and interfacing with different numbers of buses could be easily accommodated. Likewise, while the described embodiment processes STS-1 51.84 Mb/s signals, it is within the scope of the invention to process STS-3 signals, and for that matter, STS-n signals. Further, while the switching components were described as using particularly types of FIFO buffering means of particular size, those skilled in the art will appreciate that different FIFO arrangements and/or FIFOs of different buffer size could easily be utilized. Similarly, different embodiments of the read/write means, the switch matrix means and the pointer calculation means could suggest themselves to those skilled in the arts. With such different embodiments, additional functionality might present itself. For example, by expanding the destination VT register 142 and/or the destination SONET bus register 146, multicasting of VTs could be accomplished. Regardless of the exact implementation, what is critical to the invention, simply, is that the incoming SONET format signals be divided into their virtual tributaries, and that the virtual tributaries be switched in phase, time, and space to generate new SONET signals without introducing substantial delay. To accomplish the goal of phase switching (i.e. V1 and V2 pointer calculation), it is necessary both to create synchronous phase SONET generating buses whose phase is known in time and to mark the frame of each incoming virtual tributary so that its phase relative to the SONET generated bus phase is determinable. To accomplish the goal of time switching (i.e. switching from one VT to another), it is necessary to have buffers for the incoming virtual tributaries, to know the exact timing of the SONET generating buses, and to be able to provide data at a desired time to the SONET generating buses. To accomplish space switching (i.e. incoming SONET bus to outgoing SONET bus), it is necessary to have a nonblocking physical switch which couples the source of data to the SONET generating buses. Finally, to accomplish all the switching without substantial delay, it is important to establish proper synchrony between the various stages of the switch network. Thus, it is important to establish a fixed phase relationship between the SONET signals flowing downward through a stage of the switch network, and this is preferably accomplished by establishing a one system bit cycle per stage phase advance, although other phase relationships could be utilized.

It should further be appreciated by those skilled in the art that while certain terminology such as "columns", "vertical", "horizontal", etc. were used in describing the relationship between components in a switching network, those terms are relative terms and are not intended to be limiting in any manner. Further, terms such as "phase" and "time" switching are to be understood in their broadest senses, where "time" switching relates to the insertion of a VT of one SONET signal into any VT slot of another SONET signal, and where "phase" switching relates to the tracking the frame of the VT and the frame of the SONET signal being generated so that proper pointers can be calculated for the generated SONET signal. Further, it should be appreciated that the physical implementation of the means for accomplishing the phase, time, and space switching may take various forms including discrete components, integrated circuits, CMOS or bipolar transistor form, etc. Therefore, it will be apparent to those skilled in the art that yet other modifications may be made to the invention as described without departing from the scope of the invention as so claimed.

I claim:

1. A switch component for cross-connecting a plurality of virtual tributaries of at least one substantially SONET formatted data signal to generate at least one other substantially SONET formatted data signal, said switch component comprising:

(a) at least one data receiving means, each data receiving means having means for receiving a substantially SONET formatted data signal, means for disassembling said substantially SONET formatted data signal into its virtual tributary payloads, and means for recognizing and tagging bytes indicative of the phase of said virtual tributary payloads;

(b) buffer means for each virtual tributary of said received substantially SONET formatted data signal, for buffering virtual tributary payload data received from said receiving means;

(c) a plurality of time synchronous clocked output buses on which are generated said substantially SONET formatted data signals being generated;

(d) pointer calculation means associated with each buffer means, each pointer calculation means including means for determining via said tagged bytes a phase difference between the phase of a virtual tributary payload received in said buffer means and the phase of the virtual tributaries of said SONET formatted data signal being generated, and means for generating a pointer indicative of said phase difference;

(e) non-blocking space switching means for coupling said buffer means to any of said time synchronous clocked output buses; and (f) time switching means associated with each buffer means for comparing a virtual tributary destination indication for said virtual tributary payload data in said buffer means with a virtual tributary time indication based on the phase of the synchronous clocked output buses, and for writing virtual tributary payload data stored in said buffer means onto one of said output buses as dictated by said non-blocking space switching means when said destination indication and said time indication correspond.

2. A switch component according to claim 1, wherein:

each pointer calculation means comprises counter means for counting clock cycles in an initialization period from the time a predetermined byte of a virtual tributary appears on said time synchronous clocked output buses to a time associated with the time a tagged byte is written from said buffer means to one of said output buses.

3. A switch component according to claim 2, wherein:

said predetermined byte of a virtual tributary appearing on said output buses is the V3 byte of the virtual tributary payload;

said tagged byte is a V5 byte of a received virtual tributary payload; and said time associated with the time a tagged byte is written from said buffer means to one of said output buses is said time a tagged byte is written from said buffer means to said one of said output buses.

4. A switch component according to claim 2, wherein:

said means for generating a pointer comprises means for taking a count from said counter means, and means for generating virtual tributary V1 and V2 bytes containing therein a pointer based on said count.

5. A switch component according to claim 4 capable of generating positive and negative stuffs for said virtual tributaries, wherein:

said pointer calculation means further comprises tracking means for tracking said positive and negative stuffs, and increment/decrement means for incrementing and decrementing said count accordingly.

6. A switch component according to claim 5, wherein:

said predetermined byte of a virtual tributary appearing on said output bus is the V3 byte of the virtual tributary payload;

said tagged byte is a V5 byte of a received virtual tributary payload; and said time associated with the time a tagged byte is written from said buffer means to one of said output buses is said time a tagged byte is written from said buffer means to said one of said output buses.

7. A switch component according to claim 1, wherein:

said time switching means further comprises a first memory means for storing said virtual tributary destination indication, and comparison means for determining when said virtual tributary destination indication and said time indication correspond.

8. A switch component according to claim 7, wherein:

said time switching means further comprises a second memory means for storing space switch control information, wherein said control information controls said non-blocking space switching means when said destination indication and said time indication correspond.

9. A switch component according to claim 7, further comprising:

(g) component timing section means comprising means for receiving a system bit clock and a multiframe clock, means for generating therefrom said time indication representing the phase of said synchronous clocked output buses relative to said switch component, and means for sending said generated time indication to said comparison means.

10. A switch component according to claim 5, wherein:

said time switching means further comprises a first memory means for storing said virtual tributary destination indication, comparison means for determining when said virtual tributary destination indication and said time indication correspond, a second memory means for storing space switch control information, wherein said control information controls said non-blocking space switching means when said destination indication and said time indication correspond, said switch component further comprising (g) component timing section means comprising means for receiving a system bit clock and a multiframe clock, means for generating therefrom said time indication representing the phase of said synchronous clocked output buses relative to said switch component, and means for sending said generated time indication to said comparison means.

11. A switch component according to claim 1, further comprising:
(g) overhead generation means for generating SONET transport overhead information for insertion onto said time synchronous clocked buses.

12. A switch component according to claim 11, wherein:
said SONET transport overhead information comprises SONET synchronization bytes, SONET SPE pointer bytes, and a multiframe indicator byte.

13. A switch component according to claim 12, wherein:
said SONET SPE pointer bytes contain a pointer having a value of five hundred twenty-two.

14. A switch component according to claim 10, further comprising:
(h) overhead generation means for generating SONET transport overhead information including SONET synchronization bytes, SONET SPE pointer bytes containing a pointer having a value of five hundred twenty-two, and a multiframe indicator, for insertion onto said time synchronous clocked buses.

15. A switch component according to claim 1, wherein:
said means for disassembling said substantially SONET formatted data signal and said means for recognizing and tagging together comprise means for finding and recognizing SONET synchronization bytes, means for locating relative to said synchronization bytes pointer bytes to the SONET SPE payload, means for decoding said pointer bytes to the SONET SPE payload and finding V1 and V2 bytes, and means for decoding said V1 and V2 bytes to find the V5 byte.

16. A switch component according to claim 1, wherein:
said switch component includes two said data receiving means, fifty-six said buffer means, fifty-six said pointer calculation means, fifty-six said time switching means, and thirty-two said output buses.

17. A switch component according to claim 14, wherein:
said means for disassembling said substantially SONET formatted data signal and said means for recognizing and tagging together comprise means for finding and recognizing SONET synchronization bytes, means for locating relative to said synchronization bytes pointer bytes to the SONET SPE payload, means for decoding said pointer bytes to the SONET SPE payload and finding V1 and V2 bytes, and means for decoding said V1 and V2 bytes to find the V5 byte, and
said switch component includes two said data receiving means, fifty-six said buffer means, fifty-six said pointer calculation means, fifty-six said time switching means, and thirty-two said output buses.

18. A switch component according to claim 1, wherein:
said substantially SONET formatted data signal is a pure SONET signal.

19. A switch component according to claim 1, wherein:
at least a first of said plurality of virtual tributaries is of a first data rate, and at least a second of said plurality of virtual tributaries is of a second data rate.

20. A switch network for cross-connecting a plurality of virtual tributaries of a plurality of substantially SONET formatted data signals to generate a plurality of other substantially SONET formatted data signal, said switch network comprising:
(a) a plurality of chained switch components, each switch component comprising
(1) at least one data receiving means, each data receiving means having means for receiving a substantially SONET formatted data signal, means for disassembling said substantially SONET formatted data signal into its virtual payloads, and means for recognizing and tagging bytes indicative of the phase of said virtual tributary payloads,
(2) buffer means for each virtual tributary of said received substantially SONET formatted data signal, for buffering virtual tributary payload data received from said receiving means,
(3) a plurality of time synchronous clocked output buses on which are generated said substantially SONET formatted data signals being generated;
(4) pointer calculation means associated with each buffer means, each pointer calculation means including means for determining via said tagged bytes a phase difference between the phase of a virtual tributary payload received in said buffer means and the phase of the virtual tributaries of said SONET formatted data signal being generated, and means for generating a pointer indicative of said phase difference,
(5) non-blocking space switching means for coupling said buffer means to any of said time synchronous clocked output buses, and
(6) time switching means associated with each buffer means for comparing a virtual tributary destination indication for said virtual tributary payload data in said buffer means with a virtual tributary time indication based on the phase of the synchronous clocked output buses, and for writing virtual tributary payload data stored in said buffer means onto one of said output buses as dictated by said non-blocking space switching means when said destination indication and said time indication correspond,
where each of said plurality of output buses is common to each of said plurality of chained switching components to cause said switching components to be chained;
(b) clock means for providing at least a system bit clock signal to at least one of said switching components, wherein said plurality of synchronous clocked output buses are clocked according to said system bit clock signal; and
(c) offset means for causing a multiframe clock signal which indicates phases of said synchronous clocked output buses obtained at a first switch component in said chain of switch components to be $(n-1)x$ system bit clock signals ahead of a multiframe clock signal received at an n'th switch component in said chain of switch components, where x is a predetermined value, and n is an integer.

21. A switch network according to claim 20, wherein:

said clock means includes means for providing said multiframe clock signal to at least one of said switch components, and x is an integer greater than zero.

22. A switch network according to claim 21, wherein:

said offset means is included as a master counter means in each of said switch components, said master counter means including means for obtaining a multiframe clock signal and said system bit clock signal and establishing therefrom a local count related to the phase of said output buses so as to cause the switch component with which said master counter means is associated to function accordingly, said master counter further including multiframe clock generation and output means for providing a multiframe clock signal at least one bit clock cycle offset from the obtained multiframe clock signal to a master counter of an adjacent switch component.

23. A switch network according to claim 22, wherein:

said multiframe clock signal generated by said master counter is at least one bit clock cycle advanced from the obtained multiframe clock signal, and said multiframe clock signal generated by said master counter is sent to and received by a master counter of an adjacently higher switch component in said chain.

24. A switch network according to claim 21, wherein:

x equals one, said plurality of switch components equals sixteen components, said at least one data receiving means of said switch component comprises two data receiving means, and said plurality of output buses equals thirty-two output buses.

25. A switch network according to claim 24, wherein:

said plurality of switch components are arranged to provide a non-blocking switch network; and said offset means, said clock means, said non-blocking space switching means, and said plurality of time synchronous clocked output buses which chain said switch components are arranged to make said switch network to be expandable.

26. A switch network according to claim 22 wherein:

each pointer calculation means of said switch component comprises counter means for counting cycles of said system bit clock in an initialization period from the time a predetermined byte of a virtual tributary appears on said time synchronous clocked output buses to a time associated with the time a tagged byte is written from said buffer means to one of said output buses.

27. A switch network according to claim 26, wherein:

said switch components include means for generating positive and negative stuffs for said virtual tributaries;

said means for generating a pointer comprises means for taking a count from said counter means, and means for generating virtual tributary V1 and V2 bytes containing therein a pointer based on said count; and said pointer calculation means further comprises tracking means for tracking said positive and negative stuffs for said virtual tributaries, and increment/decrement means for incrementing and decrementing said count accordingly.

28. A switch network according to claim 27, wherein:

said predetermined byte of a tributary appearing on said output buses is the V3 byte of the virtual tributary said tagged byte is a V5 byte of a received virtual tributary and said time associated with the time a tagged byte is written from said buffer means to one of said output buses is said time a tagged byte is written from said buffer means to said one of said output buses.

29. A switch network according to claim 22, wherein:

said time switching means of said switch component further comprises a first memory means for storing said virtual tributary destination indication, comparison means for determining when said virtual tributary destination indication and said time indication correspond, and a second memory means for storing space switch control information, wherein said control information controls said non-blocking space switching means when said destination indication and said time indication correspond, wherein said time indication is derived from said local count related to the phase of said output buses.

30. A switch network according to claim 26, wherein:

said time switching means of said switch component further comprises a first memory means for storing said virtual tributary destination indication, comparison means for determining when said virtual tributary destination indication and said time indication correspond, and a second memory means for storing space switch control information, wherein said control information controls said non-blocking space switching means when said destination indication and said time indication correspond, wherein said time indication is derived from said local count related to the phase of said output buses.

31. A switch network according to claim 22, wherein:

said switch components further comprise overhead generation means for generating SONET transport overhead information including SONET synchronization bytes, SONET SPE pointer bytes containing a pointer having a value of five hundred twenty-two, and a multiframe indicator, for insertion onto said time synchronous clocked buses.

32. A switch network according to claim 30, wherein:

said switch components further comprise overhead generation means for generating SONET transport overhead information including SONET synchronization bytes, SONET SPE pointer bytes containing a pointer having a value of five hundred twenty-two, and a multiframe indicator, for insertion onto said time synchronous clocked buses.

33. A switch network according to claim 22, wherein:

said means for disassembling said substantially SONET formatted data signal and said means for recognizing and tagging together comprise means for finding and recognizing SONET synchronization bytes, means for locating relative to said synchronization bytes pointer bytes to the SONET SPE payload, means for decoding said pointer bytes to the SONET SPE payload and finding V1 and V2 bytes, and means for decoding said V1 and V2 bytes to find the V5 byte, and each said switch component includes two said data receiving means, fifty-six said buffer means, fifty-six said pointer calculation means, fifty-six said time switching means, and thirty-two said output buses.

34. A switch network according to claim 32, wherein:
said means for disassembling said substantially SONET formatted data signal and said means for recognizing and tagging together comprise means for finding and recognizing SONET synchronization bytes, means for locating relative to said synchronization bytes pointer bytes to the SONET SPE payload, means for decoding said pointer bytes to the SONET SPE payload and finding V1 and V2 bytes, and means for decoding said V1 and V2 bytes to find the V5 byte, and each said switch component includes two said data receiving means, fifty-six said buffer means, fifty-six said pointer calculation means, fifty-six said time switching means, and thirty-two said output buses.

35. A switch network according to claim 20, wherein:
at least a first of said plurality of virtual tributaries is of a first data rate, and at least a second of said plurality of virtual tributaries is of a second data rate.

* * * * *